UNITED STATES PATENT OFFICE.

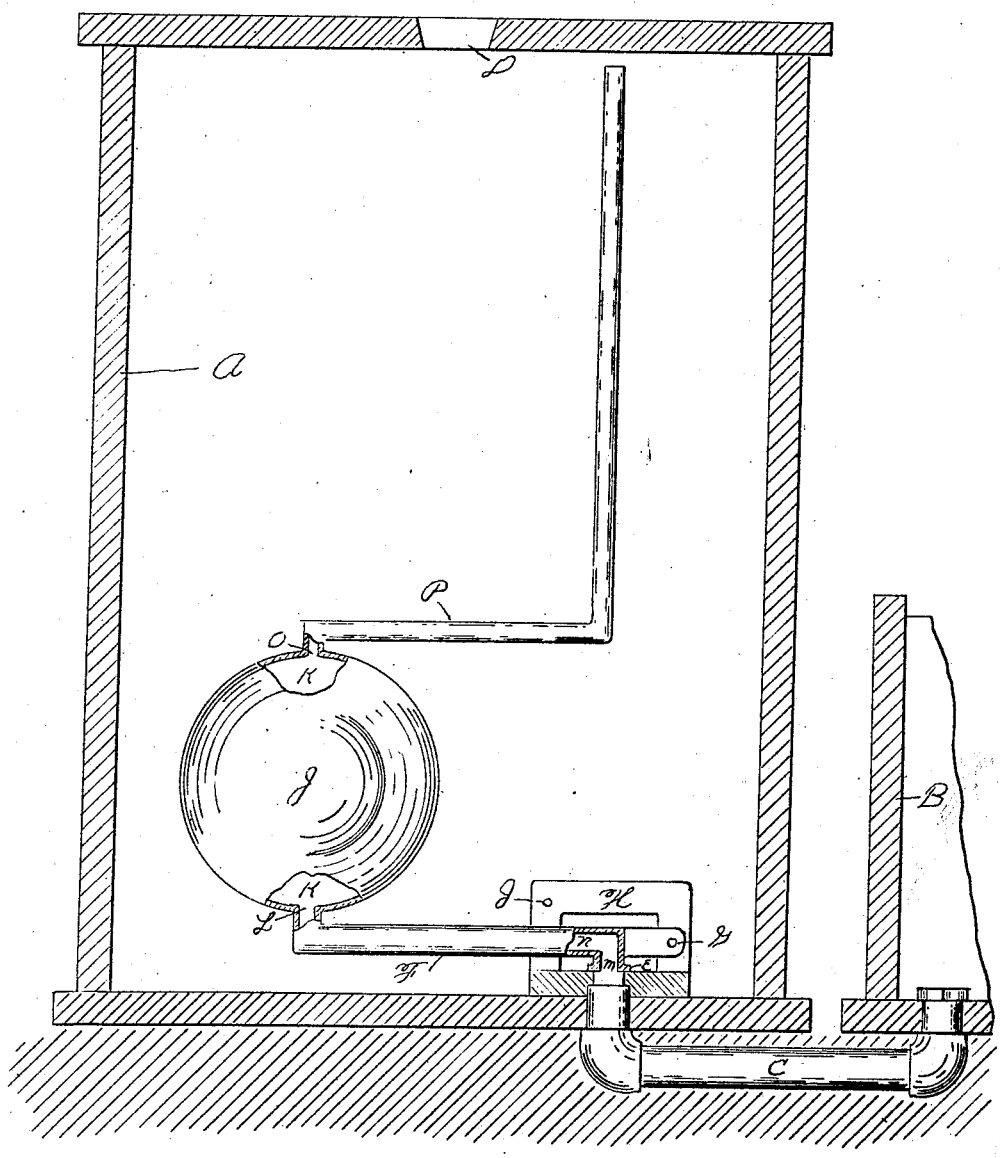

OTTO E. OLSON, OF RED WING, MINNESOTA.

FLOAT WATER-FEED CONTROL.

1,161,958.  Specification of Letters Patent.  Patented Nov. 30, 1915.

Application filed May 1, 1915. Serial No. 25,236.

*To all whom it may concern:*

Be it known that I, OTTO E. OLSON, a citizen of the United States, residing at Red Wing, in the county of Goodhue and State of Minnesota, have invented a new and useful Float Water-Feed Control, of which the following is a specification.

My invention relates to improvements in float water-feed controls, such as are in general use on farms for controlling the flow of water from a large storage tank or reservoir into a smaller stock tank or watering trough, standing on the same or nearly the same level as the storage tank, and the object of my improvement is to provide a control that may be placed in the storage or discharging tank where it is out of reach of the stock and more easily protected from freezing than a control placed in a receiving tank or watering trough to which cattle must have access. I attain this object by the mechanism illustrated in the accompanying drawing in which—

A is a storage tank, B a stock tank or watering trough, C a conducting pipe between A and B, and D an opening in the top of the storage tank through which it may be filled by windmill or other means.

E is a valve connected to the lever F, which in turn is connected to the fulcrum pin G in a pair of standards or supports H, the opposite ends of which serve as a guide for the lever in keeping the valve in position over the outlet opening.

I is a pin in the guide standards for limiting the upward movement of the lever and of the float J. The apparatus is so placed in the storage tank that when the float is at its highest point sufficient water will enter the float chamber and sink the float before the water overflows the watering trough.

K is a chamber within the float J, L a water port through the shell of the float, M a water port through valve E leading from its face side and N a water port in the lever F, connecting L and M, and forming of L, M and N one continuous water passage.

O is an air port through the shell of the float and P an air tube or extension of air port O to a point above the water in the storage tank.

The operation may be described as follows: The water in the storage tank will cause the float to rise, carrying with it the lever and the valve connected thereto, and permit the water to flow through the conducting pipe into the watering trough and also through the water ports L, M and N into chamber K. For practical purposes the float is made of such weight that when it is full or partly full of water it will bear down on the lever with sufficient force to close the valve securely. The water will continue rising in the tank B and in chamber K until there is sufficient water in said chamber to close the valve. When the valve is thus closed, and as it is shown in the drawing, it will be observed that pipe C, water ports L, M and N and chamber K form a continuation or extension of tank B and when cattle drink from said tank and the level of the water therein is lowered, the water in chamber K will seek this lower level through ports L, M and N and pipe C, and relieve the pressure on the lever and valve and water will again flow through the valve.

I am not aware that prior to my invention hollow floats or float water feed controls for controlling the flow of water into a receiving tank from a discharging tank so as to prevent the receiving tank from overflowing and adapted to be placed within the discharging tank so that such controlling action is independent of any variation of the water level in the discharging tank have been made or invented and these features of the present device are therefore broadly claimed as novel in this invention and it will be obvious that many modifications may be made in the details of the apparatus described without departing from the spirit or scope of the invention. Hence I do not limit myself to the precise construction and arrangement of parts hereinabove referred to and illustrated in the accompanying drawing; but I claim broadly:

1. The combination with a reservoir arranged to receive water from a well or other source, of a watering trough, a hollow float within the reservoir, a communication between the chamber within the float and the watering trough, an air communication between the chamber within the float and a place above the level to which it may be desired to fill the reservoir, and means whereby a communication will be established between the reservoir and the watering trough and between the chamber within the reservoir and the chamber within the float when the float rises and cut off when the float descends.

2. The combination with a reservoir arranged to receive water from a well or other source, of a watering trough, a conducting pipe between the reservoir and the watering trough, a valve adapted to close and open the conducting pipe, a hollow float within the reservoir for controlling the valve so as to open such valve when said float rises and close such valve when said float descends, a direct or indirect communication between the chamber within the float and the conducting pipe, and an air communication between the chamber within the float and a place above the level to which it may be desired to fill the reservoir.

3. The combination with a reservoir, of a watering trough, a conducting pipe between the reservoir and the watering trough, a valve adapted to close and open the conducting pipe, a hollow float within the reservoir for controlling the valve so as to open such valve when said float rises and close such valve when said float descends, a direct or indirect communication between the chamber within the float and the watering trough, and an air communication between the chamber within the float and a place above the level to which it may be desired to fill the reservoir.

4. The combination with a reservoir arranged to receive water from a well or other source, of a watering trough, a hollow float within the reservoir, a communication between the chamber within the float and the watering trough, an air communication between the chamber within the float and a place above the level to which it may be desired to fill the reservoir and means whereby a communication will be established between the reservoir and the watering trough when the float rises and cut off when the float descends.

OTTO E. OLSON.

Witnesses:
CHRISTINA OLSON,
ADA OLSON.